(12) United States Patent
Shelby et al.

(10) Patent No.: US 6,231,642 B1
(45) Date of Patent: May 15, 2001

(54) GLASS MEMBRANE FOR CONTROLLED DIFFUSION OF GASES

(75) Inventors: James E. Shelby, Alfred Station, NY (US); Brian E. Kenyon, Pittsburgh, PA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/288,628

(22) Filed: Apr. 9, 1999

(51) Int. Cl.$^7$ ................................................ B01D 53/22
(52) U.S. Cl. .......................... 95/45; 95/53; 95/55; 96/10
(58) Field of Search ................................. 95/45, 53, 55, 95/56; 96/4, 10, 11

(56) References Cited

U.S. PATENT DOCUMENTS

| | | | | |
|---|---|---|---|---|
| 2,892,508 | * | 6/1959 | Kohman et al. .......................... | 95/53 |
| 3,019,853 | * | 2/1962 | Kohman et al. .......................... | 95/53 |
| 3,022,858 | * | 2/1962 | Tillyer et al. .......................... | 95/53 X |
| 3,135,591 | * | 6/1964 | Jones ........................................ | 95/53 |
| 4,302,217 | | 11/1981 | Teitel ...................................... | 48/180 |
| 4,328,768 | * | 5/1982 | Tracy et al. ........................... | 95/55 X |
| 4,482,360 | * | 11/1984 | Taketomo et al. .................... | 95/56 X |
| 4,842,620 | | 6/1989 | Hammel et al. ......................... | 55/16 |
| 4,853,001 | * | 8/1989 | Hammel .................................. | 95/53 X |
| 4,902,307 | * | 2/1990 | Gavalas et al. ........................ | 96/10 X |
| 5,326,640 | | 7/1994 | Japka ...................................... | 428/403 |
| 5,342,431 | * | 8/1994 | Anderson et al. ....................... | 95/45 |
| 5,344,798 | | 9/1994 | Morimoto et al. ...................... | 501/70 |
| 5,772,735 | * | 6/1998 | Sehgal et al. .......................... | 96/10 X |
| 5,830,812 | | 11/1998 | Shelestak et al. ....................... | 501/71 |

* cited by examiner

Primary Examiner—Robert H. Spitzer
(74) Attorney, Agent, or Firm—Blake T. Biederman (57) ABSTRACT

A glass structure for controlled permeability of gases includes a glass vessel. The glass vessel has walls and a hollow center for receiving a gas. The glass vessel contains a metal oxide dopant formed with at least one metal selected from the group consisting of transition metals and rare earth metals for controlling diffusion of the gas through the walls of the glass vessel. The vessel releases the gas through its walls upon exposure to a radiation source.

20 Claims, 5 Drawing Sheets

GLASS MEMBRANE FOR CONTROLLED DIFFUSION OF GASES

TECHNICAL FIELD

This invention relates to glass having controlled permeability. In particular, this invention relates to glass vessels and methods for storage and separation of gases.

BACKGROUND ART

Glass is almost infinitely selective in separations involving either hydrogen or helium. In addition, glass spheres have been proposed as a means for storing hydrogen. The extremely low permeability of hydrogen through glass at ambient temperatures provides a basis for using glass microspheres as a medium for hydrogen storage and separation devices. A disadvantage associated with these devices is that the glass has insufficient permeability for rapid release of the gas. This lack of permeability affects devices employing glass microspheres by requiring enormous surface areas for rapidly loading and unloading hydrogen.

Designers have attempted to solve this problem by using temperature to control the permeability of hydrogen or helium through the glass. These processes require temperatures in excess of 300° C. to increase the permeability of hydrogen or helium sufficiently for satisfying the requirements of commercial applications. Unfortunately, the costs associated with the energy and the energy management systems required to adjust permeability are unacceptable for commercial applications. In addition, the slow response or lag time associated with the temperature change does not lend itself to a market where users are accustomed to just turning a valve to receive products.

For example, Robert J. Teitel, in U.S. Pat. No. 4,302,217 "Hydrogen Supply System", describes the use of glass microspheres to store hydrogen. Applying heat to the glass microspheres increases the permeability of the glass to release hydrogen from storage. The released hydrogen then serves as a clean-burning fuel for automobiles. Similarly, Hammel, et. al. in U.S. Pat. No. 4,842,620 "Process of Gas Enrichment with Porous Siliceous-Containing Material," describe the use of hollow glass fibers having pore sizes ranging from 1 to 50 Angstroms in diameter as a device for performing gas separations. This device relies upon the one-way diffusion of gas through glass fibers to enrich gas streams.

As far as known, the low permeability of gases through glass has prevented glass spheres from achieving commercial acceptance for gas storage applications. Furthermore, the lag time associated with releasing hydrogen from glass microspheres prohibits their use for applications that demand an immediate supply of gas. Finally, gas separation applications require enormous lengths of fiber to separate commercial quantities of gas.

It is an object of the invention to provide a cost effective alternative to current commercial methods for storage and transport of gases such as hydrogen that rely on high pressure tanks or use of its liquid phase.

It is a further object of the invention to provide a low-cost selective membrane for separating gases.

SUMMARY OF THE INVENTION

A glass structure for controlled permeability of gases includes a glass vessel. The glass vessel has walls and a hollow center for receiving a gas. The glass vessel contains a metal oxide dopant formed with at least one metal selected from the group consisting of transition metals and rare earth metals for controlling diffusion of the gas through the walls of the glass vessel. The vessel releases the gas through its walls upon exposure to a radiation source.

The method controls permeability of gases in a vessel. The vessel includes a glass membrane having controlled diffusion. Providing a pressure drop across the glass membrane provides a driving force to send a gas through the glass membrane. The pressure drop consists of the glass membrane separating a high pressure region and a low pressure region within the vessel. Then irradiating the glass membrane accelerates diffusion of the gas through the glass membrane to the low pressure region.

DETAILED DESCRIPTION

It has been discovered that radiation, such as infrared (IR) radiation, excites glass to increase permeability of gases. Although the system operates with undoped glasses, it is advantageously doped with metal oxides. Initiating this process with doped glasses at room temperature results in at least a 5 fold rate increase in the rate of gas diffusion compared to diffusion rates associated with the undoped glass at 400° C. Since gas diffusion rates through glass are normally proportional to the glass temperature, this represents a substantial increase in diffusivity. Calculations indicate that the diffusion rates achieved with doped glass and IR radiation could not occur below the melting point of glass.

The dopants that can produce the enhanced permeability effect can be metal oxides selected from at least one metal selected from the group of transition metals (elements 21 through 30, 39 through 48, 57 through 80 and 89) and rare earth elements (elements 58 through 71 and 90 through 103 of the periodic table). Concentrations of the metal oxide dopants advantageously range from about 0.1 to 10 weight percent. This specification expresses all compositions in weight percent, unless specifically noted otherwise.

In addition, the change in permeability (going from low gas permeability to high gas permeability) is significantly faster with IR radiation than the thermal approach. Vessels employing this concept perform more like high-pressure gas storage systems that use standard control valves.

EXAMPLE 1

The method is illustrated by taking a glass such as that designated as code 7740 or code 7070 (Table 1). These borosilicate glasses were produced by remelting ground samples of the commercial glass with either $Fe_3O_4$ or CuO ranging from 1 to 3 wt % (Table 2). Since these glasses produce very viscous melts, the remelted, doped glasses were quenched, ground, and remelted repeatedly until their optical appearance indicated relatively uniform dispersion of the colorant into the glass.

TABLE 1

| Base Glass Formulation wt % | | | | | | |
|---|---|---|---|---|---|---|
| Code | $SiO_2$ | $B_2O_3$ | $Al_2O_3$ | $Li_2O$ | $Na_2O$ | $K_2O$ |
| 7070 | 72 | 25 | 1 | 0.5 | 0.5 | 1 |
| 7740 | 81 | 13 | 2 | | 4 | |

TABLE 2

| Preferred Doped Glass Formulations wt % | | | | | | | |
|---|---|---|---|---|---|---|---|
| Code | $SiO_2$ | $B_2O_3$ | $Al_2O_3$ | $Li_2O$ | $Na_2O$ | $K_2O$ | Transition Metal Oxide |
| 7070D | 70–72 | 24–25 | 0.5–1 | 0.2–0.5 | 0.2–0.5 | 0.5–1 | 1–3 |
| 7740D | 78–81 | 12–13 | 1.5–2 | | 2–4 | | 1–3 |

Figure 1:
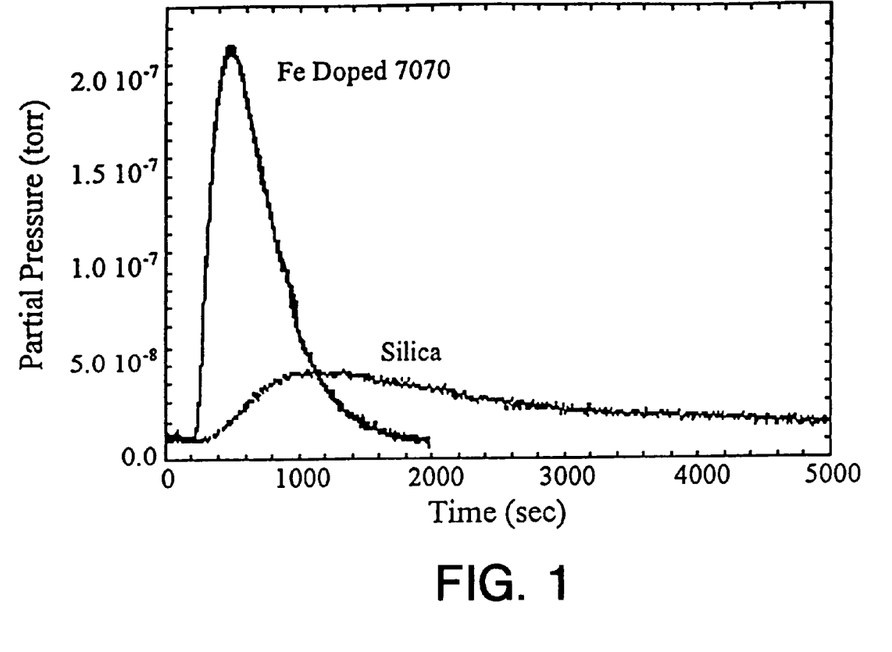
FIG. 1 illustrates the effect of IR radiation in accelerating helium diffusion through borosilicate glass 7070 doped with 2 wt % $Fe_3O_4$ in comparison to undoped glass.

A saturation unit is heated and filled with a test gas at approximately 700 torr to saturate each glass sample with the test gas. A saturated sample is then rapidly cooled to room temperature to lock the gas into the glass and transferred to an outgassing apparatus equipped with an IR source. (All of the Examples described in this application used this preparation process.) Exposing code 7070 glass doped with 2 wt % $Fe_3O_4$ to IR radiation increased the diffusion rate significantly. All of the helium was removed from the doped 7070 sample in approximately 1500 seconds. The undoped silica sample required several thousand seconds for the silica sample and this time period was insufficient to outgas the entire vessel. This particular set of measurements was made using a quantitative mode of operation, where the actual pumping of the gas through the system limited the removal rate. As a result, the actual gas release rate was faster than the results shown. Since the measurement was run in the quantitative mode, a helium solubility was calculated in the doped 7070 sample. The doped 7070 sample value obtained a $2.2 \times 10^{17}$ atoms/cm²-atm for helium with IR radiation. FIG. 1 shows that IR radiation dramatically improved diffusivity for the doped sample.

EXAMPLE 2

Figure 2:
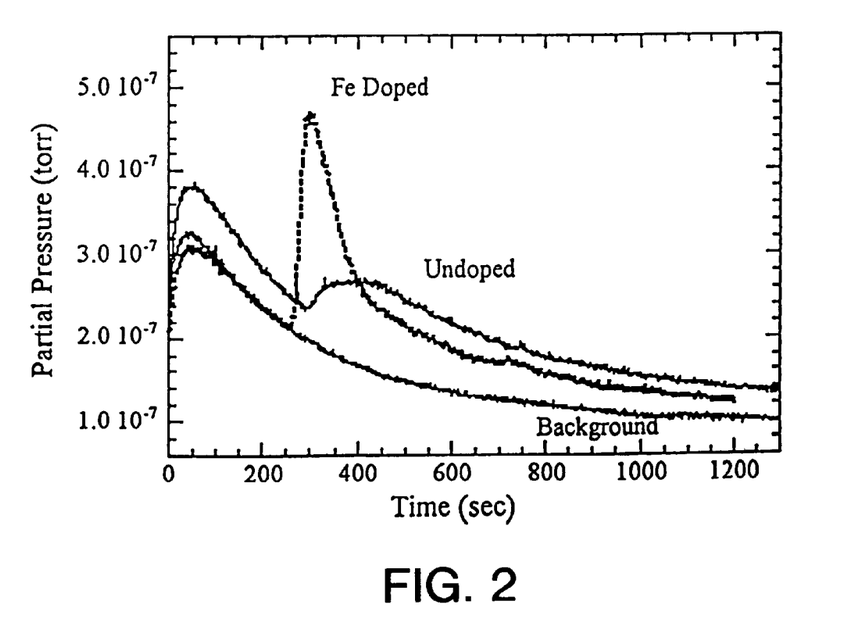
FIG. 2 illustrates the effect of IR radiation in accelerating hydrogen diffusion through borosilicate glass 7070 doped with 2 wt % $Fe_3O_4$ in comparison to undoped glass.
Figure 3:
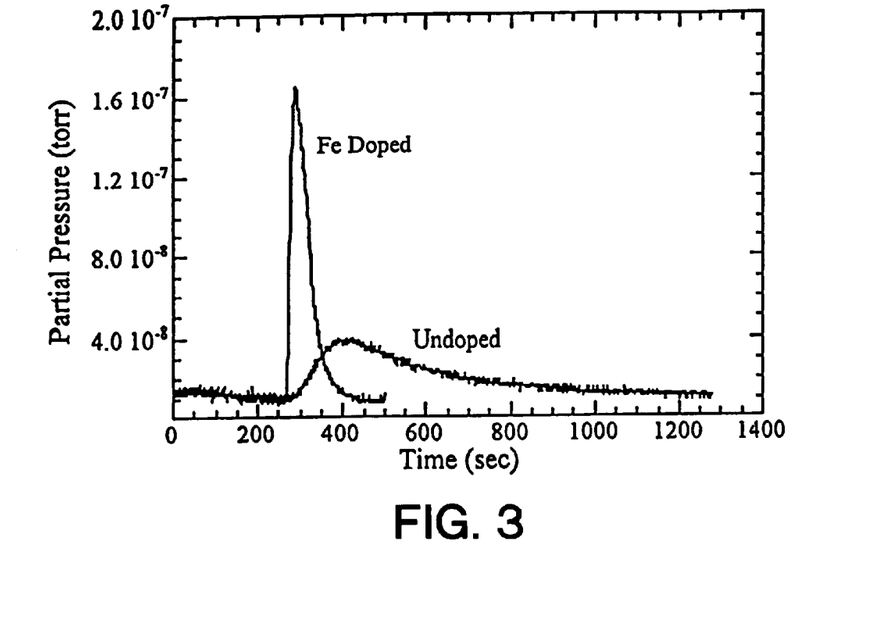
FIG. 3 illustrates the effect of IR radiation in accelerating deuterium diffusion through borosilicate glass 7070 doped with 2 wt % $Fe_3O_4$ in comparison to undoped glass.

Results obtained for hydrogen and deuterium in the doped and undoped 7070 glass are shown in FIGS. 2 and 3. The results for hydrogen are complicated by the presence of a large background, which decays with time. All of the hydrogen however was removed from the sample within a period of a few minutes. The data for deuterium, where the background from the atmosphere was much lower, more clearly show the effect of the dopant on the outgassing curve. Essentially all of the gas was removed from the doped sample (1 mm thick) in $\leq 400$ seconds—gas from the undoped sample was still evolving after 1000 seconds.

EXAMPLE 3

Figure 4:
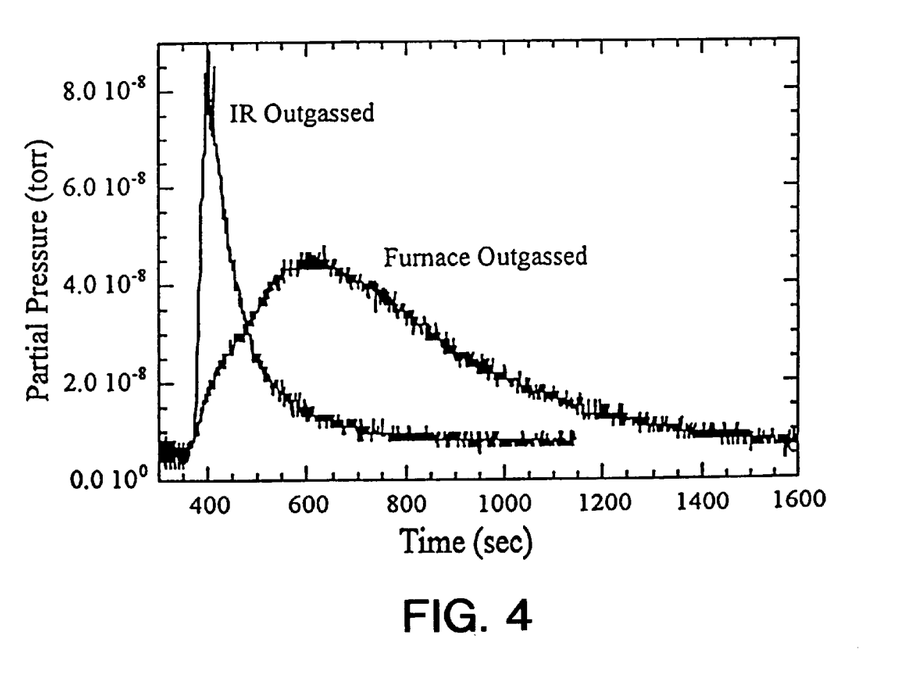
FIG. 4 illustrates outgassing rate for deuterium through borosilicate glass 7740 doped with 0.5 wt % $Fe_3O_4$ in comparison to samples heated with a tube furnace to 400° C.

The effect of heating was studied by comparing the outgassing rates from identical samples where deuterium was driven out of the sample either by exposure to radiation from the light source or by placing the tube furnace (preheated to 400° C) around the sample tube. In this case, the 7740 glass used contained only 0.5 wt % $Fe_3O_4$. In comparison to 2 wt % doped glass, this lower quantity of iron oxide dopant reduced the effectiveness of the light source. FIG. 4 illustrates that use of the IR light source yields much more rapid outgassing of the sample than a conventional heat source.

EXAMPLE 4

Figure 5:
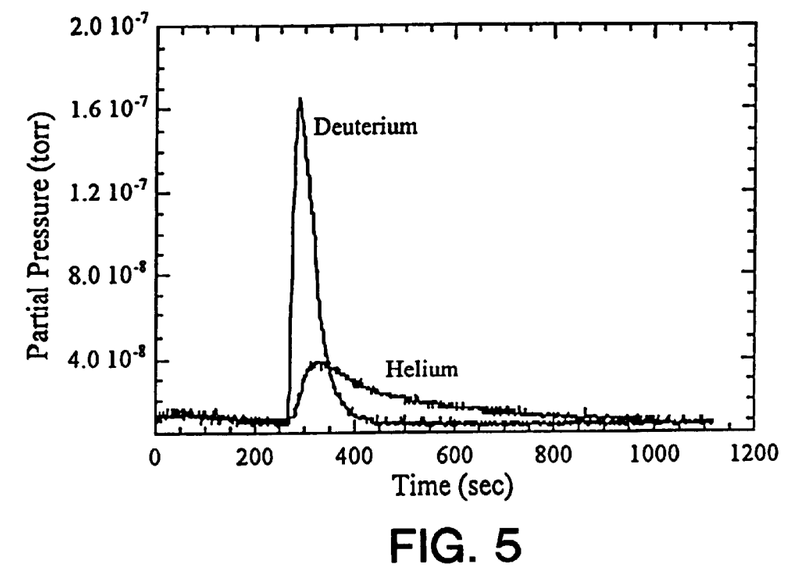
FIG. 5 compares the diffusion rate of deuterium and helium through borosilicate glass 7740 doped with 2 wt % $Fe_3O_4$.

FIG. 5 establishes that these results are not due to simple heating effects of IR radiation by comparing the behavior of a sample containing deuterium with that of one containing helium. Conventional studies of gas diffusion in glasses indicated a faster diffusion rate for helium than for deuterium. The results of FIG. 5 are contrary to the conventional studies. These results indicate that hydrogen isotopes can be removed from the doped borosilicate glasses (both 7070 and 7740) at least as fast as, and usually faster than, helium by exposing the sample to IR light. While the exact mechanism responsible for this behavior is not known, it is outside the range of traditionally expected behavior for gas diffusion in glasses.

EXAMPLE 5

Figure 6:
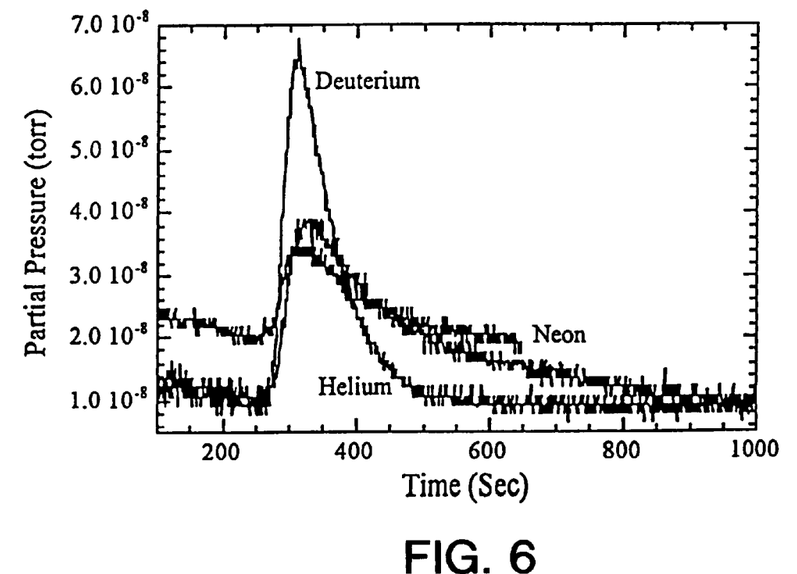
FIG. 6 compares the diffusion rate of deuterium, helium and neon through borosilicate glass 7070 doped with 2 wt % $Fe_3O_4$.

Neon is known to have a diffusion coefficient less than hydrogen and orders of magnitude less than helium in borosilicate glasses. Results of an experiment using helium, deuterium, and neon in the 2% Fe-dopant 7070 glass (FIG. 6) indicate that neon diffusivity is also dramatically increased. In fact, there is relatively little difference between the outgassing rates for these three gases in our experiments, even though the diffusivities of these gases in this glass should vary by orders of magnitude at 400° C.

EXAMPLE 6

Figure 7:
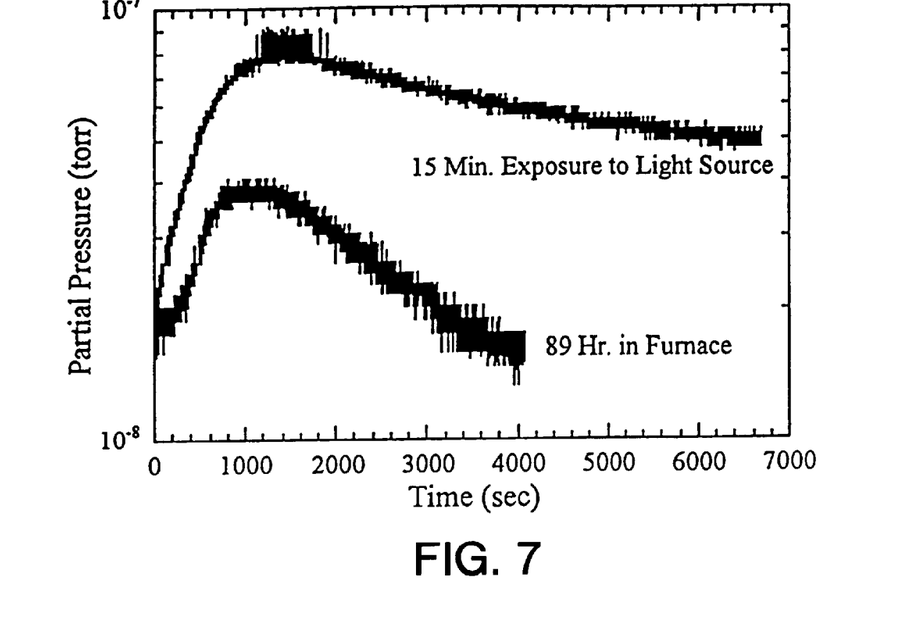
FIG. 7 compares the use of 89 hours in a furnace to 15 minutes exposure to IR radiation to induce diffusion of argon through borosilicate glass 7740 doped with 2 wt % $Fe_3O_4$ at equal pressures.

Data for argon diffusion have only been reported for vitreous silica due to the extremely low values for glasses, which make traditional diffusion measurements difficult. Extrapolation from higher temperature data for argon diffusion in silica and assumption that the diffusivity should be similar for 7740 glass indicated that hundreds of hours should be needed to saturate a sample of 7740 glass with argon at 400° C. A sample of this glass was exposed to argon at 400° C. for a weekend (89 hours). A second sample was placed in the same system, under the same argon pressure, and exposed to the lamp radiation for 15 minutes. A thermocouple placed next to the sample reached a temperature of 359° C. at the end of the 15-minute exposure. Outgassing of the two samples using the light source (FIG. 7) indicated that more argon entered the glass during 15 minutes of lamp exposure, than in 89 hours at 400° C. The fact that a large portion of the argon can be driven out of the sample in times measured in thousands of seconds instead of hundreds of hours also indicates the enormous increase in diffusivity induced by use of the IR lamp for outgassing.

EXAMPLE 7

Figure 8:
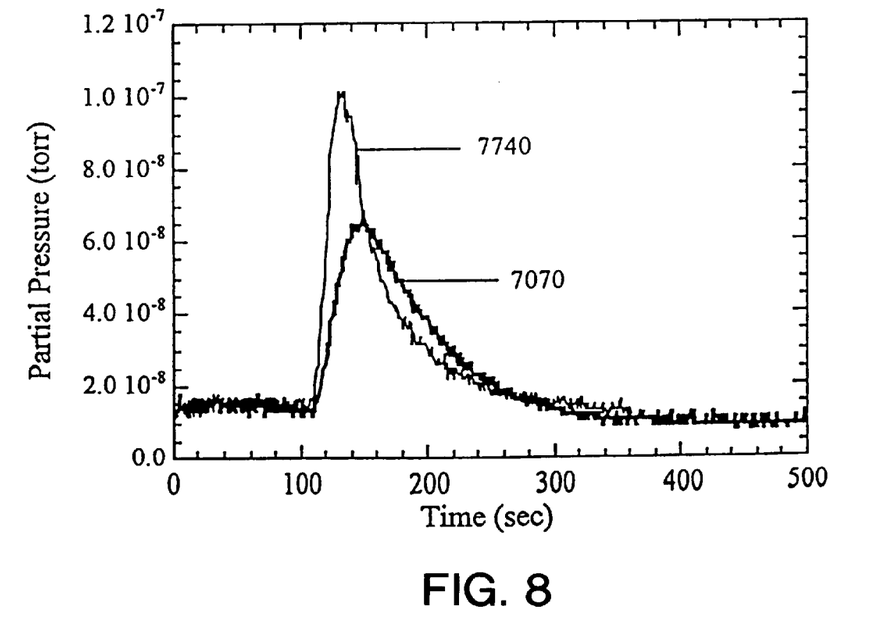
FIG. 8 compares outgassing rate of deuterium in borosilicate glasses 7070 and 7740 doped with 2 wt % $Fe_3O_4$.

Referring to FIG. 8, a comparison of outgassing of deuterium through 7740 and 7070 yielded similar results. Although these data indicate that the outgassing rate for deuterium was slightly faster for the 7740 samples, this may arise from small differences in the actual versus nominal (2 wt % $Fe_3O_4$) dopant level, sample thickness, and other variables.

EXAMPLE 8

Figure 9:
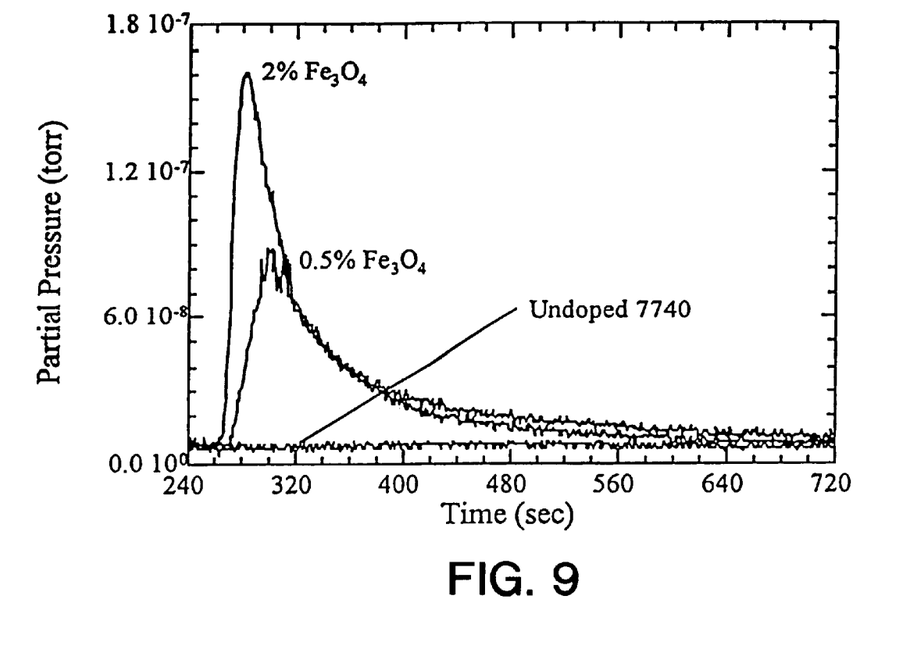
FIG. 9 compares outgassing rate of deuterium in borosilicate glass 7740 doped with 0, 0.5 and 2 wt % $Fe_3O_4$.

The effect of the iron oxide dopant level on the outgassing of deuterium in 7740 samples is quite strong, as shown in FIG. 9. The rate of outgassing increased substantially as the iron oxide concentration increased.

EXAMPLE 9

Figure 10:
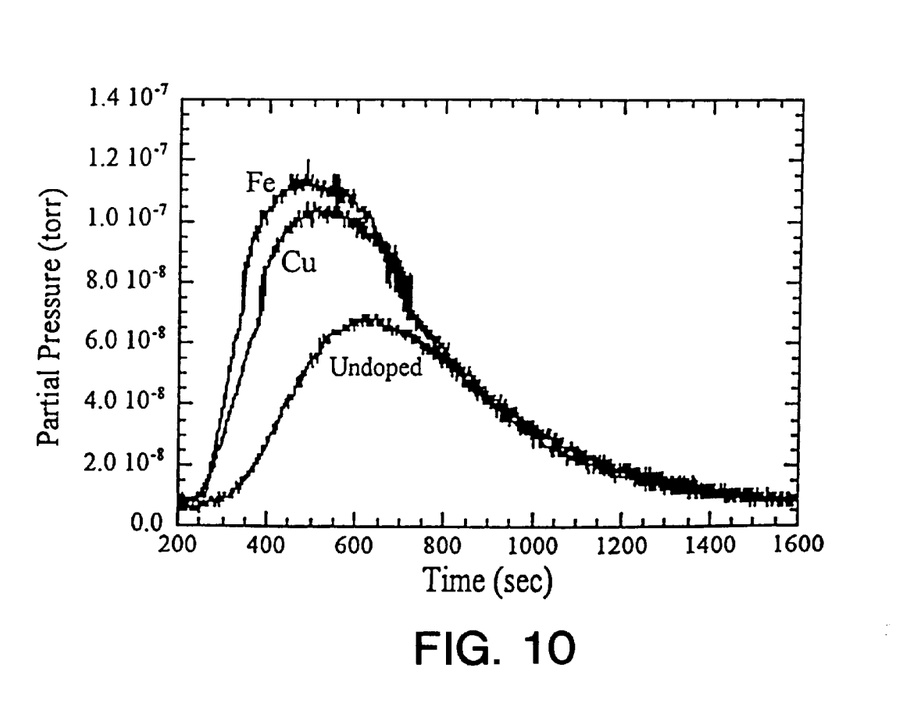
FIG. 10 compares outgassing rate of helium in borosilicate glass 7070 doped with 0 wt % dopant, 2 wt % $Fe_3O_4$ and 2 wt % CuO.

Referring to FIG. 10, the effect of identity of the dopant on the outgassing rate indicated that CuO is about as effective a dopant as $Fe_3O_4$. The $Cu^{2+}$ ions of CuO also appear to create a strong absorption band in these glasses. The absorption band is shifted toward the visible spectrum relative to the 2+ ions of $Fe_3O_4$. In both cases however, the glass is very dark, with little transmission in the visible light range. The iron-doped glasses should absorb much more radiation in the region between 1 and 2 $\mu$m.

Microsphere Storage System

The glass can be formed into any useable shape such as microspheres that can be used for hydrogen storage, transport, and distribution. As currently conceived, a complete use cycle for storing hydrogen in hollow glass microspheres includes: gas filling, transporting, storing, and gas discharging. Economics and environmental concerns dictate that depleted microspheres from large beds be recycled and recharged. Single-use cartridge concepts may be feasible in the long-term for very small consumers of hydrogen.

Gas Filling

Filling microspheres with high-pressure hydrogen gas will be a batch process that involves purging, gas compression, exposure to infrared radiation, pressurization rate control, cooling, void space depressurization, and purging. Semi-continuous processes might be achieved through use of multiple beds or lockhopper systems.

Filling productivity and economics are limited by the ability of the glass to permeate hydrogen at sufficiently high rates. This in turn is limited by the ability to expose enough surface area of the transition metal doped microspheres to IR light ($10^{11}$ to $10^{15}$ cycles/sec frequency— ~$10^{-3}$ to ~$10^{-6}$ meters wavelength).

Previous analysis has demonstrated the need for the external pressurization rate to not exceed the ability of the thin-walled spheres to accept gas. In certain high aspect ratios of diameter-to-wall thickness (D/w), maximum pressure drops across the membrane walls must be limited during charging or the spheres can fail from elastic buckling. Lower aspect ratio microspheres are able to take the full pressure drop without failure.

Sphere internal pressure buildup and gas transfer rates follow time-dependent exponential relationships. A common method of characterizing filling performance is through use of time constants. From an analysis of mass transfer through spherical shells, the time constant for filling microspheres with hydrogen can be expressed as follows:

$$\tau_{filling} = \frac{r_1^2 w}{3 K r_2 RT},$$

where $r_1$ = inside sphere radius $r_2$ = outside sphere radius $w$ = sphere wall thickness $K$ = hydrogen permeability through glass $R$ = Universal Gas Constant $T$ = absolute gas temperature Further for systems based on using temperature to adjust glass permeability, the permeability of hydrogen through glass can be expressed as:

$$K = K_0 e^{-E_k/RT},$$

where $K_0$=Pre-exponential Coefficient $E_k$=Activation Energy

Combining these equations, it can be seen that the time constant for filling spheres is highly dependent on glass temperature. Even though the sphere material, geometry, and temperature are somewhat within the designer's control, practical considerations seem to indicate that the filling time constants are on the order of hours for temperatures of about 300° C.

To attain final storage gas density, it is necessary to heat the bed of microspheres to at least 300° C. and pressurize to approximately double the final settled pressure. The bed is cooled to ambient temperature before depressurizing the gas contained in the void space. The stored gas will be locked into the spheres as a result of much lower permeability.

A system based on using IR induced permeability control of transition metal doped glass, operates with a "switch" that increases the glass wall's permeability by several orders of magnitude. This greatly accelerates the filling operation and reduces the pressure required for gases to diffuse through the glass.

Since the gas is not substantially heated when using the IR induced permeability switch, there is minimal over-pressurization as in the glass heated case. However, some short time will be required at elevated pressure to permit some glass cooling without loss of hydrogen from the sphere.

Storage

After hydrogen gas has been loaded into the glass microspheres, we can now use them for long-term storage. Storage in this sense also includes the period of time needed to transport them from a filling facility to the end-user's location. Once there, additional requirements for the microspheres may be imposed before, during, and after gas is removed from the spheres and is consumed by the end-user.

In order to maintain purity of the gas such as hydrogen for the consumer, the system stores bulk quantities of microspheres in sealed vessels or containers. These vessels contain a gas transfer conduit. This conduit is for the removal of gas upon exposure of the glass microspheres to radiation.

Most advantageously, gaseous hydrogen with a slight positive pressure protects the spheres from contamination of air or moisture. Containment pressure buildup is a good measure of storage performance. A measure-of-performance related to the length of time filled microspheres could be stored before container pressure rises to a relief setpoint. This "No Loss Hold Time" is analogous to the storage of liquid hydrogen in cryogenic pressure vessels. In fact, the U.S. Department of Transportation regulates the design and certification of liquid hydrogen transports to meet or exceed certain levels of "No Loss Hold Time".

Gas Withdrawal

Withdrawing pure hydrogen gas from a glass microsphere bed to meet a customer's demand requires several things. The bed of hollow microspheres must facilitate high permeation rates when called upon to satisfy product flow rate needs. The gas must be available at useful pressure levels (at least 100 psig). Furthermore, the delivery system must be capable of load-following without significant delays.

If direct heating is used to raise glass permeability to a level sufficient for a commercial supply system, bed temperatures must once again reach 300° C. or greater as was the case for microsphere filling. The difference however, is that this heating process places the glass in its highest stress state of all operating modes. The internal pressure within the glass spheres will double from normal storage levels assuming that the internal gas temperature will closely track the wall temperatures. Since void space pressures will remain approximately 100 psig, the membrane stresses in the glass walls will be much higher than during ambient storage. The maximum sphere aspect ratio (D/w) which can be used is a function of filling pressure and glass strength.

As an example of a possible storage system, storing hydrogen gas at 3000 psig inside hollow microspheres requires pressurizing the gas to approximately 6000 psig and heating the bed to 300° C. Withdrawing the gas first requires reheating the bed to 300° C. At that point, creating 6000 psig internally and maintaining its external pressure at 100 psig. The maximum strength of engineered microspheres using the fabrication technology developed at LLNL is about 150,000 psi. Assuming an optimistic safety factor of 1.5, the maximum aspect ratio can be determined as a function of filling pressure.

$$(D/w) < \frac{4\sigma_{max}/F_s}{P_{charge}}$$

In this example, $$(D/w) < \frac{(4)(150,000)/(1.5)}{6000}$$

$$(D/w) < 67$$

However, these same aspect ratio spheres could be filled to higher pressures (and greater storage densities), if the withdrawal operation could be accomplished at approximately ambient temperature. At ambient temperature, the maximum sphere aspect ratio could be doubled (D/w=134 instead of 67) and less glass could contain the same hydrogen pressure. In either approach, the weight efficiency of microsphere storage could be improved significantly. Furthermore, using the IR induced permeability control of transition metal doped glass concept at the use-point results in a much simpler supply system that uses less energy and permits more efficient use of the glass.

Although the system operates with any glass, the basic glass formulas advantageously includes "about" the formulations of glasses in the following table with incidental impurities.

TABLE 3

| | Range of Undoped Glass Compositions | | | | | |
|---|---|---|---|---|---|---|
| Component | $SiO_2$ | $B_2O_3$ | $Al_2O_3$ | $Na_2O$ | $K_2O$ | CaO |
| Range | 30–96 | 1–25 | 0.5–20 | 0–20 | 0–20 | 0–15 |

The wavelength of the radiation needed to provide the permeability change can be within the range from the red end of visual light (~$0.5 \times 10^{-6}$ meters) to the low end of the microwave spectrum (~$5 \times 10^{-3}$ meters)

In addition to applying this method to hydrogen storage in microspheres other gases can be stored (hydrogen, helium, neon, argon, etc.), transported, and supplied using the IR enhanced permeation phenomenon. The method may also be used for separation processes where a glass fiber or other glass type membrane is doped with the appropriate transition metal oxide and subject to IR radiation to enhance the permeability of a gas through the membrane.

The invention provides a cost effective alternative to current commercial methods for storage and transport of gases such as hydrogen that rely on high pressure tanks or use of its liquid phase. The invention stores gases in glass microspheres for quick release by radiation such as IR radiation. Most advantageously, exposing the glass microspheres to the IR radiation releases at least about 90 weight percent of the gas in less than about 5 minutes. In addition, the invention provides a low-cost selective membrane for separating gases such as hydrogen, helium, argon and neon. The selective membrane may have a sheet-like, hollow fiber, spherical, microspherical or any other shape capable of separating mixed gases. The sheet-like and hollow fiber shapes advantageously permit flow of a first gas at a high pressure through the membrane to a low pressure side. A second gas having lower diffusivity through the glass membrane remains substantially on the high pressure side of the membrane. Then collecting the first gas diffused through the membrane and the second gas at opposite sides of the membrane concentrates the gases. Separating processes that rely on spherical shapes require a first diffusion step, a gas purging step to remove non-diffused gas and then a second gas diffusion step to release the gas that diffused into the sphere.

Although the invention has been described in detail with reference to certain preferred embodiments, those skilled in the art will recognize that there are other embodiments of the invention within the spirit and the scope of the claims.

What is claimed is:

1. A method for controlled permeability of gases through glass comprising the steps of:
    (a) introducing a gas into a vessel, said vessel including a glass membrane, said glass membrane controlling diffusion of said gas;
    (b) providing a pressure drop across said glass membrane in said vessel, said pressure drop occucrring with said glass membrane separating a high pressure region from a low pressure region; and
    (c) irradiating said glass membrane to diffuse said gas at an increased rate through said glass membrane to said low pressure region.

2. The method of claim 1 including the additional step of storing a light gas selected from the group consisting of hydrogen and helium in said vessel.

3. The method of claim 1 wherein said gas is a mixed gas and said mixed gas contacts said glass membrane, said mixed gas includes a first gas having a different diffusivity through said glass membrane upon said irradiating and a second gas having a lower diffusivity through said gas membrane than said first gas upon said irradiating and said irradiating said glass membrane diffuses said first gas through said glass membrane to separate said first gas from said second gas.

4. The method of claim 1 wherein the irradiating consists of exposing said glass membrane to infrared radiation.

5. The method of claim 4 wherein said glass membrane includes glass microspheres and exposing said glass microspheres to said infrared radiation for less than about 5 minutes releases at least about 90 weight percent of said gas.

6. The method of claim 4 wherein exposing said glass membrane to said infrared radiation increases diffusivity rate of said gas through said glass membrane by a factor of at least 5.

7. The method of claim 1 wherein said glass membrane contains a metal oxide dopant formed with at least one metal selected from the group consisting of transition metals and rare earth metals.

8. A glass structure for controlled permeability of gases comprising a glass vessel, said glass vessel having walls and a hollow center for receiving a gas, and said glass vessel containing a metal oxide dopant formed with at least one metal selected from the group consisting of transition metals and rare earth metals for controlling diffusion of said gas through said walls of said glass vessel and diffusing said gas through said walls of said glass vessel at an increased rate upon exposure to a radiation source.

9. The glass structure of claim 8 wherein said glass vessel is formed with a borosilicate glass containing by weight percent about 30 to 96 $SiO_2$, about 1 to 25 $B_2O_3$, about 0.5 to 20 $Al_2O_3$, about 0 to 20 $Na_2O$, about 0 to 20 $K_2O$, about 0 to 15 CaO and incidental impurities.

10. The glass structure of claim 9 wherein said glass vessel contains about 0.1 to 10 weight percent transition metal oxide dopant.

11. The glass structure of claim 8 wherein said transition metal oxide dopant is selected from the group consisting of $Fe_3O_4$ and CuO.

12. The glass structure of claim 11 wherein said glass vessel contains about 1 to 3 weight percent metal oxide dopant and said metal oxide dopant forms a uniform dispersion.

13. The glass structure of claim 8 wherein the irradiating of said glass vessel diffuses said gas through said walls upon exposure to radiation having a wavelength of about $5 \times 10^{-3}$ to $0.5 \times 10^{-6}$ meters.

14. The glass structure of claim 8 including a container, said glass vessel consists of a plurality of glass microspheres and said container includes said plurality of glass microspheres for storing said gas in said glass microspheres and the irradiating diffuses said gas through said glass microspheres.

15. A glass structure for controlled permeability of gases comprising a vessel, said vessel having a gas transfer conduit and a plurality of glass microspheres, the glass microspheres having a hollow center for receiving a gas, said glass microspheres containing a metal oxide dopant formed with at least one metal selected from the group consisting of transition metals and rare earth metals for controlling diffusion of said gas and a radiation source for releasing said gas through said gas transfer conduit upon exposure of said radiation source to said plurality of glass microspheres.

16. The glass structure of claim 15 wherein said glass microspheres are formed with a borosilicate glass containing by weight percent about 30 to 96 $SiO_2$, about 1 to 25 $B_2O_3$, about 0.5 to 20 $Al_2O_3$, about 0 to 20 $Na_2O$, about 0 to 20 $K_2O$, about 0 to 15 CaO and incidental impurities.

17. The glass structure of claim 15 wherein said plurality of glass microspheres contain about 0.1 to 10 weight percent metal oxide dopant.

18. The glass structure of claim 15 wherein said metal oxide dopant is selected from the group consisting of $Fe_3O_4$ and CuO.

19. The glass structure of claim 18 wherein said plurality of glass microspheres contain about 1 to 3 weight percent metal oxide dopant and said metal oxide forms a uniform dopant.

20. The glass structure of claim 15 wherein said radiation source emits radiation at a wavelength of between about $5 \times 10^{-3}$ and $0.5 \times 10^{-6}$ meters.

\* \* \* \* \*